US007026375B1

(12) United States Patent
Stevens

(10) Patent No.: US 7,026,375 B1
(45) Date of Patent: Apr. 11, 2006

(54) PVA-CONTAINING COMPOSITIONS

(75) Inventor: Henry Guy Stevens, North Chrencester (GB)

(73) Assignee: PVAXX Research and Development Limited, Gloucestershire (GB)

( * ) Notice: Subject to any disclaimer, the term of this patent is extended or adjusted under 35 U.S.C. 154(b) by 0 days.

(21) Appl. No.: 09/763,678

(22) PCT Filed: Aug. 26, 1999

(86) PCT No.: PCT/GB99/02822

§ 371 (c)(1),
(2), (4) Date: Jun. 4, 2001

(87) PCT Pub. No.: WO00/12615

PCT Pub. Date: Mar. 9, 2000

(30) Foreign Application Priority Data

Aug. 26, 1998 (GB) ................... 9818604

(51) Int. Cl.
C08K 5/05 (2006.01)

(52) U.S. Cl. .................. 523/124; 264/211; 524/366; 524/388; 524/389; 524/399; 524/400; 524/425

(58) Field of Classification Search ............. 524/503, 524/230, 386, 388, 389, 399, 400, 425; 523/124; 264/211

See application file for complete search history.

(56) References Cited

U.S. PATENT DOCUMENTS

| 2,897,854 A | 8/1959 | Moreland |
| 3,159,545 A | 12/1964 | Kidwell et al. |
| 3,233,022 A | 2/1966 | Henry et al. |
| 3,470,122 A | 9/1969 | Ridgeway et al. |
| 3,713,965 A | 1/1973 | Widiger et al. |
| 3,791,802 A | 2/1974 | Holowaty |
| 3,810,468 A | 5/1974 | Harper et al. |
| 3,954,721 A | 5/1976 | Gross |
| 3,980,663 A | 9/1976 | Gross |
| 3,983,095 A | 9/1976 | Bashaw et al. |
| 3,989,586 A | 11/1976 | Bashaw et al. |
| 3,997,489 A | 12/1976 | Coker |
| 4,155,957 A | 5/1979 | Sasayama |
| 4,194,901 A | 3/1980 | Gambacorta |
| 4,206,101 A | 6/1980 | Wysong |
| 4,221,700 A * | 9/1980 | Minagawa et al. .......... 524/120 |
| 4,229,410 A * | 10/1980 | Kosti ............................. 4/222 |
| 4,248,819 A | 2/1981 | Mayer et al. |
| 4,263,251 A | 4/1981 | Voegle |
| 4,298,858 A | 11/1981 | Romanski |
| 4,332,917 A | 6/1982 | Heslinga et al. |
| 4,338,417 A | 7/1982 | Heslinga et al. |
| 4,362,559 A | 12/1982 | Perez et al. |
| 4,389,506 A | 6/1983 | Hassall, Jr. |
| 4,409,171 A | 10/1983 | Leon et al. |
| 4,418,163 A | 11/1983 | Murakami et al. |
| 4,420,588 A | 12/1983 | Yoshioka et al. |
| 4,424,016 A | 1/1984 | Matsuda et al. |
| 4,436,682 A | 3/1984 | Knopp |
| 4,451,610 A * | 5/1984 | Collister ..................... 524/514 |
| 4,469,837 A | 9/1984 | Cattaneo |
| 4,571,315 A * | 2/1986 | Gerontopoulos et al. ..... 264/0.5 |
| 4,616,063 A | 10/1986 | Le-Khac |
| 4,672,087 A * | 6/1987 | Miller et al. ................. 524/141 |
| 4,705,773 A | 11/1987 | Le-Khac |
| 4,721,619 A * | 1/1988 | Panoz et al. ................. 424/459 |
| 4,724,121 A * | 2/1988 | Weyand ........................ 204/291 |
| 4,731,067 A | 3/1988 | Le-Khac |
| 4,743,244 A | 5/1988 | Le-Khac |
| 4,788,237 A | 11/1988 | Le-Khac |
| 4,798,861 A | 1/1989 | Johnson et al. |
| 4,813,945 A | 3/1989 | Le-Khac |
| 4,849,256 A | 7/1989 | Newman et al. |
| 4,880,868 A | 11/1989 | Le-Khac |
| 4,892,533 A | 1/1990 | Le-Khac |
| 5,051,222 A * | 9/1991 | Marten et al. ............... 264/143 |
| 5,137,969 A * | 8/1992 | Marten et al. ................ 525/56 |
| 5,176,751 A | 1/1993 | Findley |
| 5,373,054 A | 12/1994 | Sanuki et al. |
| 5,395,880 A | 3/1995 | Sato et al. |
| 5,444,128 A * | 8/1995 | Ichizuka et al. ............. 524/297 |
| 5,476,718 A * | 12/1995 | Ichizuka et al. ............. 405/267 |
| 5,552,461 A * | 9/1996 | Redd et al. ............... 106/162.2 |
| 5,597,857 A * | 1/1997 | Thibaut et al. ........... 252/400.1 |
| 5,811,488 A | 9/1998 | Narumoto et al. |
| 5,814,266 A | 9/1998 | Pienkowski et al. |
| 5,852,114 A * | 12/1998 | Loomis et al. .............. 523/128 |
| 5,922,808 A | 7/1999 | Hanada et al. |
| 5,948,848 A * | 9/1999 | Giltsoff ..................... 524/227 |
| 6,054,519 A | 4/2000 | Jakob et al. |

(Continued)

FOREIGN PATENT DOCUMENTS

CA 890 833 1/1972

(Continued)

OTHER PUBLICATIONS

Kroschwitz, Concise Encyclopedia of Polymer Science and Engineering, 1990, John Wiley & Sons, USA Primary Examiner—Bernard Lipman
(74) Attorney, Agent, or Firm—Hodgson Russ LLP

(57) ABSTRACT

An extrudable PVA-containing composition is disclosed, which enables PVA articles to be manufactured on conventional extrusion apparatus. The compositions includes a lubricant, such as a fatty acid amide, most preferably octodecanamide and is most preferably formed into pellets by cold pressing. The compositions are suitable for manufacturing a variety of products.

22 Claims, No Drawings

U.S. PATENT DOCUMENTS 6,103,823 A * 8/2000 Centofanti et al. ........... 525/60

FOREIGN PATENT DOCUMENTS

| | | |
|---|---|---|
| DE | 41 27522 A1 | 3/1992 |
| EP | 0 095 874 A1 | 12/1983 |
| EP | 0 101 253 A2 | 2/1984 |
| EP | 0 169 382 A2 | 1/1986 |
| EP | 0 213 799 A1 | 3/1987 |
| EP | 0 227 305 A2 | 7/1987 |
| EP | 0 232 121 A2 | 8/1987 |
| EP | 0 233 014 A2 | 8/1987 |
| EP | 0 264 208 A2 | 4/1988 |
| EP | 0 268 498 A2 | 5/1988 |
| EP | 0 269 393 A2 | 6/1988 |
| EP | 0 272 074 A2 | 6/1988 |
| EP | 0 326 382 A2 | 8/1989 |
| EP | 0 342 919 A2 | 11/1989 |
| EP | 0 397 410 A2 | 11/1990 |
| EP | 0 401 044 A2 | 12/1990 |
| EP | 0 404 723 A2 | 12/1990 |
| EP | 0 436 514 A2 | 7/1991 |
| EP | 0 635 545 A2 | 1/1995 |
| FR | 2 525 121 | 10/1983 |
| FR | 2 714 326 A1 | 6/1995 |
| FR | 2 724 388 A1 | 3/1996 |
| GB | 0 937 057 A | 9/1963 |
| GB | 1 040 506 A | 8/1966 |
| GB | 1 272 617 A | 5/1972 |
| GB | 1 397 127 A | 6/1975 |
| GB | 2 022 505 A | 12/1979 |
| GB | 2 082 614 A | 3/1982 |
| GB | 2 126 591 A | 3/1984 |
| GB | 2 269 602 A | 2/1994 |
| GB | 2 270 030 A | 3/1994 |
| GB | 1 051 514 A | 12/1996 |
| IE | 970280 | 9/1997 |
| JP | 01 022 500 | 1/1989 |
| JP | 04 081 440 | 3/1992 |
| JP | 06 179 235 | 6/1994 |
| JP | 10 250 701 | 9/1998 |
| JP | 2000289097 | 10/2000 |
| WO | WO 85/04365 A1 | 10/1985 |
| WO | WO 92/01556 A1 | 2/1992 |
| WO | WO 92/20329 A1 | 11/1992 |
| WO | WO 93/12275 A1 | 6/1993 |
| WO | WO 93/17066 A1 | 9/1993 |
| WO | WO 93/20141 A1 | 10/1993 |
| WO | WO 93/24684 A1 | 12/1993 |
| WO | WO 93/25735 A1 | 12/1993 |
| WO | WO 96/20973 | 7/1996 |
| WO | WO 97/09379 | 3/1997 |
| WO | WO 97/35537 A1 | 10/1997 |
| WO | WO 97/36722 A1 | 10/1997 |
| WO | WO 98/26911 A1 | 6/1998 |
| WO | WO 98/39382 A1 | 11/1998 |

* cited by examiner

PVA-CONTAINING COMPOSITIONS

The present invention relates to PVA-containing compositions, particularly filled compositions, to methods of making such compositions and to methods of extruding PVA-containing compositions.

There is currently a significant and increasing demand for bio-degradable polymers, to replace non bio-degradable polymers which take up an ever greater amount of disposal space, such as land-fill, or need to be incinerated.

Polyvinyl alcohol (PVA) is one bio-degradable polymer which is in widespread use. As a film, PVA shows a high degree of impermeability to a number of gases. Incorporated into adhesive, PVA shows high adhesive strength. PVA has significant potential in a wide range of products. However, the applications of PVA have been limited because there is currently no formulation of PVA or PVA-containing composition which can readily be extruded.

While attempts have been made to extrude articles from PVA, it has been found that melt extruded PVA becomes very unstable and significant residues become adhered to the surfaces of the extrusion apparatus, requiring very careful control of process conditions, specialised extrusion apparatus and frequent shut down of the extrusion process and purging of the apparatus.

It is known to polymerize ethylene with vinyl alcohol to provide a copolymer of ethylene-vinyl alcohol, in an attempt to retain the desirable properties of PVA whilst simultaneously obtaining an extrudable polymer. One such copolymer is marketed under the trade mark SOARNOL (registered trade mark of the Nippon Synthetic Chemical Industry Co, Limited). However, it is found that this copolymer has effectively lost all of the advantageous properties of PVA and is not an effective alternative to an extrudable PVA.

A chemically modified PVA is also known and sold as VINEX (registered trade mark of Air Products). This suffers, however, from the fact that some of the advantageous PVA properties are adversely affected by the chemical modification.

The search for biodegradable polymers is acute in relation to certain sanitary products such as diapers and sanitary towels. However, these products typically comprise superabsorbent materials and at present such materials are only available in combination with conventional non bio-degradable polymers.

The present invention is concerned, at least in preferred embodiments, with providing PVA-containing compositions, methods of manufacturing the same and methods of extruding PVA-containing compositions which overcome or at least ameliorate some of the disadvantages identified in the art.

Accordingly, a first aspect of the invention provides a PVA-containing composition comprising a blend of PVA and an amount of lubricant effective to render the blend extrudable.

The lubricant preferably comprises a fatty acid amide and the composition may advantageously further comprise a plasticiser, the resultant blend being suitable for extrusion in conventional melt-extrusion apparatus. In embodiments of the invention, a PVA-containing composition comprises up to 20%, especially 5 to 15%, plasticizer and up to 5%, especially 0.5 to 2.5%, lubricant, by weight.

The composition of the present invention is thus an extrudable PVA-containing polymer, typically with a flexural modulus similar to other extrudable polymers. Known advantageous properties of PVA, such as its high tensile strength, good puncture resistance, and good barrier characteristics are retained in an extrudable composition which can be processed on current extrusion lines, blow-moulders and injection moulders without modification, and without the processing problems such as thermal degradation and high temperature cross linking, observed in attempts to extrude articles using hitherto known PVA-containing compositions.

In embodiments of the invention, extrudable PVA-containing compositions have been obtained comprising fully hydrolysed PVA as well as partially hydrolysed PVA, and including PVA that is 70% or more hydrolysed.

Further embodiments of the invention provide PVA-containing compositions in which the molecular weight of the PVA varies from around 20,000, in some cases from around 10,000, to greater than 150,000. Generally, the application of the present invention is not limited to PVA of any particular percent hydrolysis nor of any particular molecular weight.

A second aspect of the invention provides a filled PVA-containing composition comprising a blend of PVA plus filler. In this composition, the filler is effectively a bulking agent and is relatively inexpensive compared to the PVA, thus a composition is obtained retaining advantageous properties of PVA whilst being cheaper per unit weight to produce.

In both aspects, the invention preferably provides a PVA-containing composition in the form of pellets or tablets. These preferably have a size of between about 1 mm and 5 mm in diameter and are suitably obtained by a method of the invention in which PVA, preferably substantially uncompounded and in powder or granular form, is mixed with at least one of lubricant and filler, and optionally other compounding ingredients, and cold pressed to form a tablet or pellet. This cold-pressing method is substantially as described in WO-A-98/26911 in relation to different polymers.

With this method, the ingredients can be uniformly mixed and compounded in the correct proportions for the final product, and made into a form that is easier to handle than powder. In addition, since the mixture is cold pressed rather than melted, problems of thermal degradation or variation in properties are reduced.

References to "cold pressing" are intended to imply applying pressure to the powder to cause agglomeration without substantial melting of the polymer. The temperature is preferably less than about 100 degrees Celsius, more preferably less than about 70–80 degrees Celsius. Preferably heat is not applied directly to the mixture. However, heat may be generated by mixing and/or pressing, and this may be allowed to warm the mixture, or cooling may be provided. It is permissible for some heat to be applied directly if necessary to facilitate binding. Some melting of the polymer or other ingredients may occur, particularly on a microscopic scale as a result of pressure at the interface between adjacent particles, but it is important that the bulk of the polymer granules do not liquefy.

Preferably, the mixture is compressed in discrete quantities into tablets or pellets, for example in a tablet press; this may provide more reliable agglomeration.

However, it is possible for the mixture to be extruded under pressure through an orifice, the pellets forming following exit of the mixture from the orifice. In such a case, binder or moisture may be added to the mixture, preferably as the mixture is extruded, or after preliminary mixing of the constituents.

Preferably, the mixture is substantially dry, but includes sufficient residual moisture to bind the tablets or pellets on pressing. This avoids the need to add a separate binder, and allows the tablets or pellets to be broken more easily as they enter the extruder simply by drying them further. When water is relied upon for binding, it is desirable to ensure that the tablets or pellets are dried prior to extruding, for example at between 40 and 80 degrees Celsius for 4–8 hours; this alleviates problems of vapour formation during extrusion. The moisture content is desirable to form the tablets, but after forming, the tablets should in most cases retain their shape even when dried.

Preferably, the moisture content is less than about 10% by weight, and preferably greater than 0.01% by weight, more preferably less than about 5%. If the pellets or tablets are extruded or otherwise formed at relatively low pressures, however, the moisture content may be about 20% or even higher to ensure binding. If the pellets are too moist, they may tend to stick together, inhibiting flow, and drying after forming may be desirable.

The moisture may comprise residual moisture in the polymer or in one or more of the compounding ingredients. In this way, moisture can be provided automatically simply by not drying the ingredients fully prior to mixing.

It is preferred that the filled PVA-containing composition is extrudable, and hence preferred that the filled PVA-containing composition further comprises an effective amount of a lubricant to render the composition extrudable. The lubricant suitably comprises a fatty acid amide or a plasticiser or a mixture of both a fatty acid amide and a plasticiser.

The lubricant in compositions of the invention is provided so as to improve the thermal stability of the composition under extrusion. The lubricant may be referred to as an internal lubricant, in that its function is to improve lubrication between the polymer chains. Compositions of the invention may be intended for use in or in connection with food stuffs, and hence it is preferred that the lubricant is approved for food use. It is further preferred that the lubricant is a fatty acid amide, and particularly a straight or branched $C_{12}$–$C_{24}$ fatty acid amide, more particularly $C_{16}$–$C_{20}$. Particularly and surprisingly good results are obtained if the lubricant comprises stearamide, a straight chain $C_{18}$ fatty acid amide.

The compositions of the invention typically further include a plasticiser, to lower the melt temperature of the polymer under extrusion. The plasticiser may suitably be selected from glycerine, ethylene glycol, triethylene glycol, low molecular weight polyethylene glycols and low molecular weight amides. A particularly preferred plasticiser comprises or consists of glycerol.

While the proportion of components present may vary in compositions of the invention, embodiments of the invention generally comprise, by weight, up to 50% filler and up to 5% lubricant. More particular embodiments of the invention comprise, by weight, 5–50% filler, 40–80% PVA, up to 5% lubricant and 5–20% plasticizer.

Compositions of the invention are thus extrudable, but it may be that ease of extrusion depends partly upon the state of the extrusion apparatus, in particular the roughness of surfaces in the apparatus. In further embodiments of the invention, the compositions comprises an additional lubricant, which may be referred to as an external lubricant, to prevent or reduce adhesion of the composition to such surfaces. This external lubricant is typically present at 0.001 to 0.1% by weight of the composition and preferably approved for food use, in the same way as the internal lubricant. Stearate salts are suitable external lubricants, in particular magnesium, lead or zinc stearates.

Fillers for incorporation into compositions of the invention may suitably be selected from conventional polymer fillers. Typically the filler is an inert, inorganic material and a particularly preferred filler is or comprises talc, calcium carbonate. In a specific embodiment of the invention, this talc may be micronised, such as in particles with a mean size of about 20 microns and may further be coated, such as with a stearate. One such coated, micronised talc is available from Croxton and Gary as 90T (trade mark of Croxton and Gary).

It is further an option for the filler to comprise or consist of a superabsorbent material. In a specific embodiment of the invention, described in an example below, a filled PVA-containing composition comprises a superabsorbent which contains cross-linked sodium polyacrylate (available from Alloid Colloids as SALISORB CL31 (registered trade mark)). Filled compositions of the invention may nevertheless contain superabsorbent material of substantially any type. Incorporation of such superabsorbent material confers the particular advantage that sanitary products such as diapers and sanitary towels, hitherto major components of waste storage sites such as land-fill sites, may now be made of or comprise a significant proportion of bio-degradable material.

A number of water-absorbent compositions are known and suitable for use as the filler in embodiments of the invention. For example, U.S. Pat. Nos. 3,954,721 and 3,983,095 disclose preparations for derivatives of copolymers of maleic anhydride with at least one vinyl monomer in fibrous form. The fibrous copolymers are rendered hydrophilic and water-swellable by reaction with ammonia or an alkali metal hydroxide. U.S. Pat. No. 3,810,468 discloses lightly cross-linked olefin-maleic anhydride copolymers prepared as substantially linear copolymers and then reacted with a diol or a diamine to introduce cross-linking. The resultant lightly cross-linked copolymers are treated with ammonia or an aqueous or alcohol solution of an alkali metal hydroxide. U.S. Pat. No. 3,980,663 describes water-swellable absorbent articles made from carboxylic polyelectrolytes via cross-linking with glycerine diglycidyl ether. These patents are incorporated herein by reference.

European Published Application No. 0 268 498 (incorporated herein by reference) describes a water-absorbent composition formed by causing a substantially linear polymer of water-soluble ethylenically unsaturated monomer blends comprising carboxylic and hydroxylic monomers to cross-link internally.

Further examples of water-absorbent compositions are those produced from a copolymer of an $\alpha,\beta$ unsaturated monomer having at least one pendant unit selected from a carboxylic acid group and derivatives thereof and a copolymerisable monomer. A proportion of the pendant units are present in the final copolymer as the free acid and a proportion as the salt of the acid. These copolymers are capable of being cross-linked, either internally or with a variety of cross-linking agents, to form the water-swellable composition. Examples of water-swellable compositions of this type can be found in U.S. Pat. Nos. 4,616,063, 4,705,773, 4,731,067, 4,743,244, 4,788,237, 4,813,945, 4,880,868 and 4,892533 and European Patent Nos 0 272 074 and 0 264 208 and European Published Application No. 0 436 514 which are incorporated herein by reference.

Derivatives of carboxylic acid groups include carboxylic acid salt groups, carboxylic acid amide groups, carboxylic acid imide groups, carboxylic acid anhydride groups and carboxylic acid ester groups.

Other examples of water-absorbent compositions can be found in U.S. Pat. No. 4,798,861, WO93/17066, WO93/255735, WO 93/24684, WO93/12275, European Published Application Nos 0 401 044, 0 269 393, 0 326 382, 0 227 305, 0 101 253, 0 213 799, 0 232 121, 0 342 919, 0 233 014, 0 268 498 and 0 397 410, British Patent Application Nos 2 082 614, 2 022 505, 2 270 030, 2 269 602 and 2 126 591, U.S. Pat. Nos. 4,418,163, 4,418,163, 3,989,586, 4,332,917, 4,338,417, 4,420,588 and 4,155,957 and French Patent Application No. 2 525 121 which are all incorporated herein by reference.

The extrudable compositions of the invention are suitable for manufacture of substantially any article made using currently extrudable polymers, including films and bottles and any other articles. The compositions are suited to manufacture of filaments and fibre, for use in spunbond, non-woven and melt-blown applications. The composition is suitable also for manufacture of such articles as agri-chem sachets, mulch films, plant pots, domestic bags, diapers, drinking straws, fem care products, hangers, incontinence pads, sachets, six pack rings, disposable clothing, expanded foams, gloves, film canisters, golf tees, shot gun cartridges, bed pans, bottles, bowls, cotton buds, hospital curtains, "one-use" sterile products and packaging materials.

Compositions of PVA have good gas and fossil fuel barrier properties and are particularly suitable for making balloons and disposable packaging for oil and the like.

Good results have been obtained with embodiments having the following make up, by weight:
(a) 40 to 80% PVA;
(b) 5 to 50% filler;
(c) 5 to 15% plasticiser, preferably glycerol;
(d) 0.5 to 2.5% lubricant, preferably a fatty acid amide as an internal lubricant, most preferably octodecanamide.

Particularly good results have been obtained in embodiments of the invention having the following make-up, by weight:
(a) 40 to 70% PVA;
(b) 20 to 50% filler, preferably a micronised inorganic material such as talc, preferably coated with stearate;
(c) 8 to 15% plasticizer, preferably glycerol;
(d) 0.5 to 1.5% internal lubricant, preferably a fatty acid amide, most preferably octodecanamide; and
(e) 0.0001 to 0.1% external lubricant, preferably stearate.

The composition may contain residual moisture, sufficient to enable the composition to be bound as a cold-pressed tablet.

Further advantageous results have been obtained in compositions of the invention comprising, by weight:
50 to 60% PVA;
30 to 40% stearate-coated calcium carbonate;
8 to 15% glycerol;
0.5 to 1.5% octadecanamide; and
0.0001 to 0.1% zinc stearate.

In a third aspect, the invention provides a method of making an extrudable PVA-containing composition comprising blending PVA with a lubricant, said lubricant including a fatty acid amide. The method preferably comprises blending PVA with a fatty acid amide in the presence of an amount of moisture sufficient to bind the composition into tablets or pellets upon cold pressing.

The amount of lubricant blended with the PVA is typically restricted by the fact that, above a certain percent, excess lubricant separates out from the blend, and generally lubricant is blended at up to 5% by weight of the PVA present. The method thus conveniently enables tablets or pellets of the composition to be prepared as the feedstock for an extrusion. Blending of the components of the composition is achieved using conventional apparatus, one such example being a high speed blender.

The method may optionally comprise adding small amounts of moisture to the components to be blended, such as by dripping water into the blend. Preferably, PVA and lubricant are fed into a high speed mixer gravimetrically.

In a fourth aspect, the invention provides a method of making a PVA-containing composition comprising blending PVA and a filler, wherein the filler comprises a superabsorbent material. It is preferred that blending is carried out in the presence of sufficient moisture to bind the composition into tablets or pellets upon cold pressing, the moisture optionally being present in the starting materials of the blend or being introduced into the blend, such as by drip-feeding.

A fifth aspect of the invention provides a method of extruding a PVA-containing composition so as to form an extruded product which contains PVA, comprising:
blending PVA with at least one component selected from a lubricant and a filler; and
cold pressing the resultant blend into pellets or tablets;
wherein the pellets or tablets comprise the polymer feedstock for extrusion of an extruded product containing PVA.

The PVA is preferably blended with one or more lubricant or filler components in the presence of sufficient moisture to bind the blend upon cold pressing. An advantage of the method is that the PVA-containing feedstock for the extrusion step is obtainable substantially without melting of the PVA. This improves the stability of the PVA during subsequent extrusion. Hitherto, as has been recognised in the present invention, attempts to extrude a PVA-containing feedstock largely failed as the PVA already had a heat history, ie had been wholly or partially melted in processing stages prior to the extrusion stage. The present invention avoids the disadvantage of introducing such a heat history into the PVA-containing composition.

A sixth aspect of the invention provides a method of extruding a PVA-containing composition comprising blending PVA and at least one optional component selected from a lubricant and a filler to form a feedstock for an extrusion process, the feedstock being in the form suitably of powder, pellets or tablets, and extruding the feedstock into a product, wherein the feedstock is prepared substantially without melting of the PVA.

A seventh aspect of the invention provides a method of extruding a polymer composition containing a heat sensitive polymer, comprising blending the heat sensitive polymer with one or more optional components selected from a filler and a lubricant to form a feedstock for an extrusion process, the feedstock being suitably in the form of powder or pellets or tablets, and extruding the feedstock into an extruded product, wherein the feedstock is prepared substantially without melting of the heat sensitive polymer.

Optional and preferred features of the first and second aspects of the invention are, similarly, optional and preferred features of the third to seventh aspects of the invention.

The invention is now described in the following non-limiting examples.

EXAMPLE 1

A blend of, by weight, approximately 60% fully hydrolysed PVA, 30% calcium carbonate, 10% glycerol, 0.01% zinc stearate and 1% octadecanamide was prepared in a high speed blender. It was found to have a white/cream colour with the following properties:

| | |
|---|---|
| density | 1.65 g/cm³ |
| melt density | 1.46 g/cm³ at 200° C. (under ISO 1183) |
| MFR | 357 (10 mins/200° C./21.6 kilograms, under ISO 1133) |
| melt temperature | 200° C. |
| processing temperature | 190–200° C. |
| residence time | up to 15 minutes |
| drying time | 4 hours at 80° C. |

EXAMPLE 2

A blend was prepared in a similar way to example 1 of, by weight, approximately 60% partially hydrolysed PVA, 30% calcium carbonate, 10% glycerol, 0.01% zinc stearate and 1% octadecanamide. This was found to have the following properties:

| | |
|---|---|
| density | 1.65 g/cm³ |
| melt density | 1.38–1.40 g/cm³ at 190° C. (under ISO 1183) |
| MFR | 22 (10 mins/190° C./5 kilograms, under ISO 1133) |
| apparent melt viscosity | 236/49 (Pa · s 1,000 s/10,000 s) |
| melt temperature | 200° C. |
| processing temperature | 190–200° C. |
| residence time | up to 15 minutes |
| drying time | 4 hours at 80° C. |

EXAMPLE 3

The PVA-containing compositions of examples 1 and 2 were examined for their extrudability in injection-moulding machines made by Brabender, Killion, Windsor, Hesas, Battenfield, Fischer, Demag and Arburg. Extrusion processing was carried out using a single full flight screw with constant pitch. The barrel temperature had a profile of 180–200° C. (melt 190–210° C.) and the screw speed varied typically between 20 and 120 rpm. Shut down of the apparatus was carried out by maintaining the temperature for up to 15 minutes with screw rotation stopped, over a period of 3 hours reducing the temperature to 100° C. with screw rotation stopped and subsequently completing the shut down by turning the machine off.

Whether or not a given composition is extrudable (by which is meant on commonplace extrusion apparatus) will normally be clear to one skilled in the art. In the event that a test is required, however, it is suggested that extrudability is determined by attempting extrusion on one or more of the above-named manufacturers machines using a single full flight screw with constant pitch with speeds and temperatures in the above range. If the composition extrudes reliably on at least two of the above machines with routine adjustment of parameters, it is to be deemed extrudable; if consistent problems are obtained and extrusion is only possible under highly specific conditions or on specialised equipment, it is to be deemed not to be extrudable.

The compositions of both examples 1 and 2 were satisfactorily extruded into a range of films and tubes blow-moulded containers of various sizes and colours and injected moulded products.

EXAMPLES 4–9

PVA-containing compositions were prepared as blends of the following components in the amounts shown:

| | EXAMPLE | | | | | |
|---|---|---|---|---|---|---|
| Components | 4 | 5 | 6 | 7 | 8 | 9 |
| PVA - fully hydrolysed | — | — | — | 50 | 60 | 55 |
| PVA - partially hydrolysed | 50 | 60 | 55 | — | — | — |
| Calcium carbonate (coated) | 40 | 30 | 30 | 40 | 30 | 30 |
| Glycerol | 9 | 9 | 14 | 9 | 9 | 14 |
| Octadecanamide | 1 | 1 | 1 | 1 | 1 | 1 |
| Zinc Stearate | 0.01 | 0.01 | 0.01 | 0.01 | 0.01 | 0.01 |

EXAMPLE 10

A further filled PVA-containing compositions was prepared as a blend of, by weight, approximately 60% partially hydrolysed PVA, 30% cross-linked sodium polyacrylate (a superabsorbent), 9% glycerol, 1% octadecanamide and 0.01% zinc stearate.

As far as extrusion apparatus is concerned, it is advantageous to use chrome plated screws and for the melt flow path to use chrome plated surfaces and gradual tapers to streamline the melt.

The invention thus provides PVA-containing compositions for use in the manufacture of biodegradable articles. The invention extends to combinations of all features individually disclosed. In particular, optional or preferred features of any of the apparatus, product or method aspects may be combined with features of other aspects.

What is claimed is:

1. A polymer feedstock in the form of a cold-pressed tablet or pellet for use in extrusion of an extruded product containing PVA, the cold-pressed tablet or pellet comprising, by weight of the feedstock, a blend of:
   40 to 70% PVA;
   8 to 15% plasticizer;
   0.5 to 1.5% internal lubricant;
   0.0001 to 0.1% external lubricant; and
   5 to 50% solid particulate filler.

2. A polymer feedstock according to claim 1 wherein the internal lubricant comprises a fatty acid amide.

3. A polymer feedstock according to claim 2 wherein the fatty acid amide is a straight or branched C12–C24 fatty acid amide.

4. A polymer feedstock according to claim 1 wherein the plasticiser is selected from the group consisting of ethylene glycol, glycerol, triethylene glycol, polyethylene glycols and C2–C8 amides.

5. A polymer feedstock according to claim 1 wherein the filler comprises inert, inorganic material.

6. A polymer feedstock according to claim 1 wherein the filler comprises a superabsorbent material.

7. A polymer feedstock according to claim 1 wherein the filler comprises both an inert, inorganic material and superabsorbent material.

8. A polymer feedstock according to claim 5 wherein the inorganic filler comprises calcium carbonate.

9. A polymer feedstock according to claim 1 wherein the external lubricant comprises a stearate.

10. A PVA-containing polymer feedstock in the form of a cold-pressed tablet or pellet comprising, by weight of the feedstock:
40 to 80% PVA;
5 to 50% solid particulate filler;
5 to 15% plasticizer; and
0.5 to 2.5% internal lubricant.

11. A polymer feedstock according to claim 10, comprising, by weight of the feedstock:
40 to 70% PVA;
20 to 50% solid particulate filler;
8 to 15% plasticizer;
0.5 to 1.5% internal lubricant; and
0.0001 to 0.1% external lubricant.

12. A polymer feedstock according to claim 10 wherein a fatty acid amide is provided as internal lubricant.

13. A polymer feedstock according to claim 11 wherein stearate is provided as external lubricant.

14. A polymer feedstock according to claim 11 comprising, by weight of the feedstock:
50 to 60% PVA;
30 to 40% stearate-coated calcium carbonate;
8 to 15% glycerol;
0.5 to 1.5% octadecanamide; and
0.0001 to 0.1% zinc stearate.

15. A polymer feedstock according to claim 1 prepared without liquefying the bulk of the polymer granules.

16. A polymer feedstock according to claim 1 having a moisture content less than about 10% by weight of the feedstock but greater than 0.01% to bind the pellets or tablets.

17. A method of making a PVA-containing polymer feedstock according to claim 1 comprising blending the PVA with the plasticizer, the internal lubricant, the external lubricant and the filler, said internal lubricant including a fatty acid amide, in the presence of an amount of moisture sufficient to bind the polymer feedstock into tablets or pellets upon cold pressing and cold pressing the feedstock into tablets or pellets.

18. A method according to claim 17 comprising blending, in a high speed blender, the PVA and the internal lubricant.

19. A method according to claim 17 comprising adding moisture to the components to be blended.

20. A method according to claim 17 wherein PVA and lubricant are fed into a high speed mixer gravimetrically.

21. A method of making a PVA-containing polymer feedstock according to claim 17, wherein the filler comprises a superabsorbent material.

22. A method of extruding a PVA-containing polymer feedstock comprising forming a feedstock according to claim 1 and extruding the feedstock into a product, wherein the feedstock is prepared.

* * * * *